United States Patent Office 3,517,319
Patented June 23, 1970

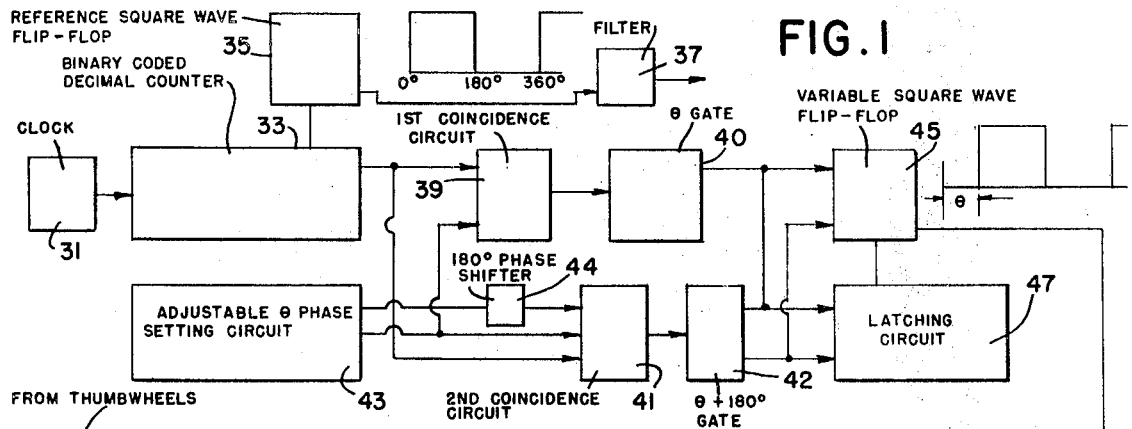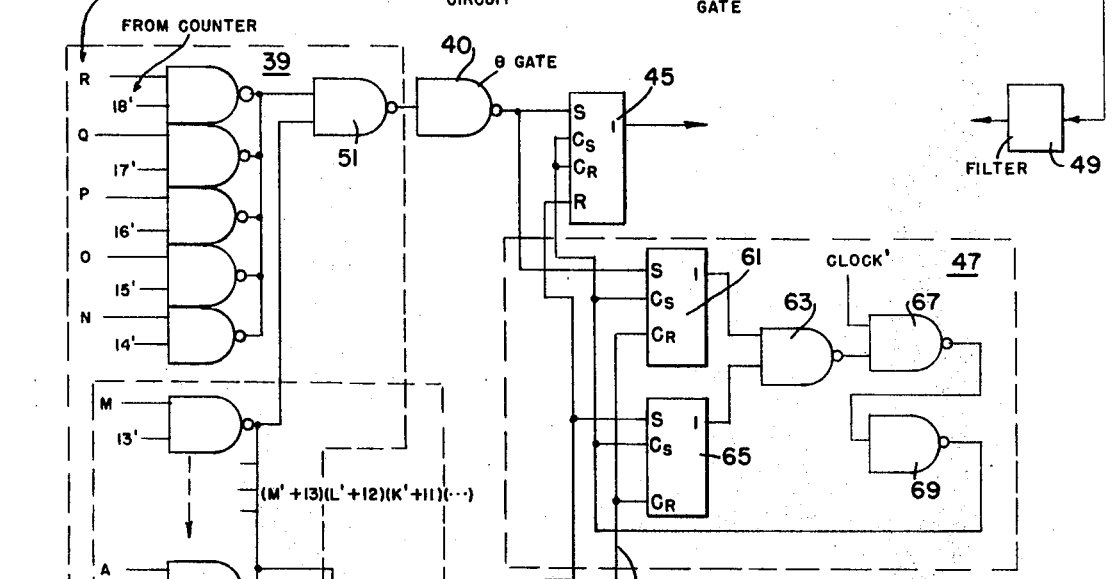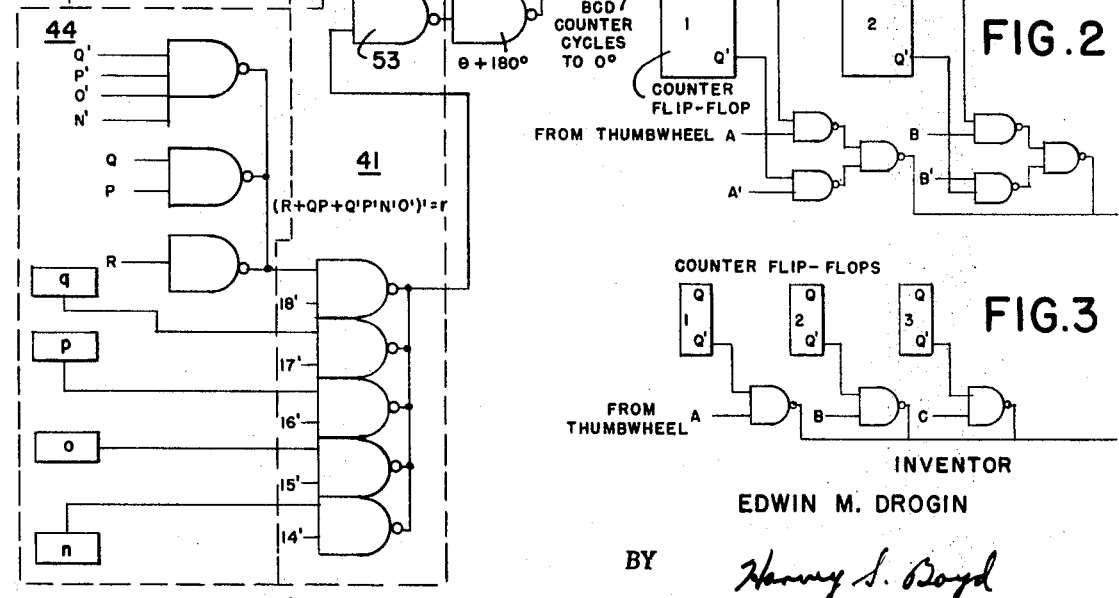

3,517,319
DIGITAL APPARATUS FOR GENERATING A WAVE HAVING AN ACCURATELY PREDETERMINED PHASE SETTING
Edwin M. Drogin, North Merrick, N.Y., assignor to the United States of America as represented by the Secretary of the Army
Filed Feb. 19, 1968, Ser. No. 706,235
Int. Cl. H03k 5/13, 5/153
U.S. Cl. 328—55                5 Claims

ABSTRACT OF THE DISCLOSURE

The present invention relates to digital apparatus for the generation of a wave having an accurately predetermined phase setting. The present apparatus utilizes NAND gate coincidence circuitry for generating a variable wave which is phase shifted from a reference wave by a predetermined amount while achieving a high degree of accuracy in the phase shift.

BACKGROUND OF THE INVENTION

In various applications it is of considerable importance to be able to accurately set the phase of one wave with respect to another. This is of prime importance in check out equipment for standard VOR aircraft navigation receivers which measure phase changes between two sine waves transmitted from a ground station. The phase difference being indicative of an aircraft's position in relation to the VOR ground station, with each variation in phase of 1° corresponding to 1° of azimuth. In present VOR systems, both the ground station and aircraft depend upon analog equipment. However, with the advent of digital VOR receivers with higher degrees of accuracy, it becomes necessary to provide digital signal generators having the same degree of accuracy in the check out equipment for the receiver.

Accordingly, it is an object of the present invention to provide means for producing a square wave having an accurately predetermined phase setting.

It is another object of the present invention to provide a sine wave which is phase shifted from a reference sine wave by a predetermined amount.

It is a further object of the present invention to utilize NAND gate coincidence circuitry in the generation of the phase shifted wave.

Other objects and many of the attendant advantages of this invention will become more fully apparent from the following detailed description when considered in connection with the accompanying drawings which illustrate a preferred embodiment.

BRIEF DESCRIPTION OF THE DRAWINGS

FIG. 1 is a block diagram arrangement of the present invention;
FIG. 2 is a prior art coincident circuit arrangement;
FIG. 3 illustrates the NAND gate coincidence circuitry of the present invention; and
FIG. 4 is a logic circuit diagram of the present invention.

DESCRIPTION OF THE PREFERRED EMBODIMENT

Referring now to the drawings, there is shown in FIG. 1 a clock 31 which feeds a binary coded decimal counter 33 for stepping the counter through a predetermined range. The counter is preferably formed with eighteen stages and is adapted to count from 0 to 35,999 and then cycle. The construction of such a counter is well known within the art. Each clock period represents, therefore, .01° of phase and with a clock frequency of 1.08 Hz., the counter will cycle at precisely a 30 Hz. rate. The output of the counter is fed to a reference flip-flop 35 which is triggered on at the 0° and off at the 180° state of the counter to provide a reference square wave. The square wave is filtered in filter 37 to produce a sine wave output. The output stages of the counter 33 also feed first coincidence circuitry 39 feeding a $\theta$ gate 40 and second coincidence circuitry 41 feeding a $\theta+180°$ gate 42.

A manually adjustable digital phase setting control 43 having the same number of stages as the counter 33 is also provided. Each stage via thumbwheel settings may be independently set to provide a logic 1 or logic 0 output so that any binary coded decimal number can be made to appear on the adjustable phase setting circuit. The output stages of the phase setting circuit also feed the first and second coincidence circuits and their respective gates. In addition, a portion of the output of the phase setting circuit 43 is passed through a phase shifting network 44 before being applied to the second coincidence circuit. The actual circuit connections will be described with reference to FIG. 4. Accordingly, the arrangement is such that when the outputs from the stages of the BCD counter 33 and the manual phase setting circuit 43 are similar at $\theta$, the first coincidence circuit 39 and the $\theta$ gate 40 provide an output to enable the setting of a variable square wave flip-flop 45. The $\theta$ gate 40 also provides an output signal to a latching circuit 47. When the outputs of the counter and phase setting circuit coincide at the 180° setting, the $\theta+180°$ gate 42 provides an output signal which enables the rest of flip-flop 45 and disables the latching circuit 47 which prevents flip-flop 45 from setting again such that the output of the flip-flop is a square wave phase shifted from the reference square wave produced by flip-flop 35 by the selected $\theta$ shift. The output of flip-flop 45 is filtered by filter 49 to provide a phase shifted variable sine wave.

FIG. 2 illustrates prior art coincidence circuitry utilizing exclusive OR logic of the type found frequently in computer comparator circuits. This arrangement is unsatisfactory, however, in that it requires three gates per bit and also requires that both the true code and its inverse be provided by the thumbwheels. For example, if the outputs of the counter chain are labeled $1, 2, 3 \ldots n$, and the outputs of the thumbwheels are labeled $A, B \ldots n$, coincidence between the counter output pulses and the thumbwheel inputs occurs as $(A1+A'1')(B2+B'2')\ldots$. When the counts in the counter chain again with the switch settings, one term in each of the logic groups will be "true" or at logic 1. Therefore, the overall expression goes to logic 1.

FIG. 3 illustrates the coincidence circuitry of the present invention. In this arrangement, the coincidence circuitry only looks for an agreement between the logic 1's in the counter chain and the binary code 1's from the thumbwheels. The logic 0's can be treated as "don't cares" and the following expression used:

$$\text{coincidence} = (A1+A')(B2+B')$$

which can be simplified to $$\text{coincidence} = (1+A')(2+B') \ldots$$

Thus, if one of the NAND gate inputs is at logic 0, the transistor in that circuit is cut off and at logic 1. That is, if flip-flop 1 is on or $A'$ is on, and the first logic gate will have its output transistor cut off. This implements the first term in the coincidence expression $(1+A')$. Similarly, if all the transistors in the chain are cut off, the common line which ties the NAND gate outputs together to implement an AND function, stays at logic 1.

With this logic circuitry, coincidence will occur as soon as the logic 1's in the counter chain are in the same position as the logic 1's on the thumbwheels. However, there will be additional coincidences at counts higher than the count set on the thumbwheel. For example, for an eighteen stage counter and thumbwheels, if thumbwheel input A is at logic 1 and B through R are at logic 0 (thumbwheel bearing setting at 0.01°), the first term $1+A'$ will equal logic 0 when the counter chain is at zero. All the remaining terms are always at logic 1 regardless of the state of the counter.

As soon as the counter goes up one count, the first flip-flop of the counter will go to logic 1 and coincidence occurs. However, at every odd count after this, i.e., three, five, seven, etc., the first flip-flop will be at logic 1 and additional undesired coincidences would occur. However, undesired coincidences are prevented from causing false operation of the variable square wave flip-flop 45 by use of the latching circuit 47 which is disabled after receiving pulses from both the $\theta$ gate 40 and the $\theta+180°$ gate 42. Thus, the undesired coincidences can then not cause flip-flop 45 to change state again improperly.

In order to generate the 30 Hz. variable, square wave, triggers must be provided at some phase angle $\theta$ and $\theta+180°$, the zero crossing points. It is not possible to provide these triggers by running the BCD counter at a 60 Hz. rate because the thumbwheel's phase steps would be twice the amount needed. Accordingly, second coincidence circuitry is provided to generate a $\theta+180°$ trigger. The following table provides the BCD codes for $\theta$ and $\theta+180°$ trigger positions.

TABLE OF CONVERSION OF $\theta$ TO $\theta+180°$

| θ | RQ | PON | θ+180° | rq | pon |
|---|----|----|--------|-----|-----|
| 0° | 00 | 000 | 180° | 01 | 100 |
| 20° | 00 | 001 | 200° | 10 | 000 |
| 40° | 00 | 010 | 220° | 10 | 001 |
| 60° | 00 | 011 | 240° | 10 | 010 |
| 80° | 00 | 100 | 260° | 10 | 011 |
| 100° | 01 | 000 | 280° | 10 | 100 |
| 120° | 01 | 001 | 300° | 11 | 000 |
| 140° | 01 | 010 | 320° | 11 | 001 |
| 160° | 01 | 011 | 340° | 11 | 010 |
| 180° | 01 | 100 | 0° | 00 | 000 |
| 200° | 10 | 000 | 20° | 00 | 001 |
| 220° | 10 | 001 | 40° | 00 | 010 |
| 240° | 10 | 010 | 60° | 00 | 011 |
| 260° | 10 | 011 | 80° | 00 | 100 |
| 280° | 10 | 100 | 100° | 01 | 000 |
| 300° | 11 | 000 | 120° | 01 | 001 |
| 320° | 11 | 001 | 140° | 01 | 010 |
| 340° | 11 | 010 | 160° | 01 | 011 |

Given $\theta$, the Boolean expression for $\theta+180°$ is:
$r' = R+QP+Q'P'O'N'$
$q' = R'Q'(P+O+N)+R'QO'N'+RQ'P'$
$p' = R'(P+O+N)+R(O'+N')$
$o' = R'P'(O'+N')+R'Q(O'+N')+RO'N'+RQ'ON$
$n' = RQ'P+RN+R'P'(O'+N')+R'Q(O'+N')$ Only the five higher order bits of the bearing code are listed because the lower order bits to the right of the fifth bit are unchanged when 180° are added to the bearing. There are therefore only eighteen codes (0° to °340 in 20° steps) that must be listed in the $\theta$ group, the Boolean expression RQ represents the two lower bits of the hundred digit and PON represents the three highest bits of the tens digit. Likewise, the hundreds and tens digit in the $\theta+180°$ group are represented by the Boolean terms $rq$ and $pon$.

The reason for eliminating the excess codes for the first thirteen bits is the commonality between the two columns. Assuming for example, that $\theta$ is an angle 325°, the hundreds digit 3 to BCD code is 11 and numeral 2, the tens digit in BCD code is 0010, the units digit 5 is 0101 in BCD code, but the last five bits are not shown because they do not change if 180° is added to a bearing. At $\theta+180°$, the angle of interest is 145°. Here the numeral 1 is represented by 01, the numeral 4 by 0100, and the numeral 5 by 0101, the duplicate of the previous number. The Boolean equations $r'$ through $n'$ show how the angle $\theta+180°$ is derived from angle $\theta$.

Thus, referring to FIG. 4, it is shown that the second coincidence circuit 41 only additionally requires outputs from the higher order bits 14 to 18 of the counter and thumbwheel outputs from the phase setting circuit to form ouputs $n$ to $r$ in the phase shifter 44 as described by the Boolean equations given in the table above to provide the coincidence for the $\theta+180°$ gate 42. As shown, the $r$ input is formed by the NAND gate combination of the R, Q, and P inputs and the N', O', P' and Q' complementary inputs as given in the table. The use of complementary inputs which are denoted by a prime (') as is well known in logic circuitry are used throughout to obtain the required output from the NAND gate logic circuitry of the present invention. Accordingly, the thus formed $r$ output serves as an input together with the complementary output 18' from the eighteenth stage of the counter to another coincidence NAND gate which provides an output of $(r'+18)$. The $n, o, p,$ and $q$ inputs to the coincidence NAND gates are formed according to the table in the same manner as the $r$ input, but are not illustrated for purposes of clarity.

Thus, as shown in FIG. 4, the arrangement is such that the first coincident circuit 39 is separated into two portions of high order coincidence gates having inputs 14' to 18' and N to R and lower order coincidence gates having inputs 1' to 13' and A to M which feed another coincidence NAND gate 51 to provide a coincidence output to $\theta$ gate 40. The second coincidence circuit 41 is arranged in the same manner with the higher order coincidence gates having inputs 14' to 18' and $n$ to $r$ and lower order coincidence gates of the first coincidence circuit feeding a coincidence NAND gate 53 to provide a coincidence output to $\theta+180°$ gate 42.

After coincidence is achieved by the first coincidence circuit, the $\theta$ gate 40 enables setting of a variable square wave flip-flop 45 to initiate the square wave output. The flip-flop 45 is formed by a J-K flip-flop with separate set and reset clock inputs, the operation of which will be discussed later. The $\theta$ gate also feeds the set input of flip-flop 61 which forms a part of the latching circuit which maintains the output of flip-flop 45 in its present state after both the $\theta$ and the $\theta+180°$ coincidences have occurred. As shown, the output of flip-flop 61 serves as one input to NAND gate 63. The $\theta+180°$ gate 42 feeds the reset input of flip-flop 45 and causes it to reset and also feeds the set input of a flip-flop 65 which also forms a portion of the latching circuit. The flip-flop 65 also feeds NAND gate 63 and the output of this gate forms one input to another NAND gate 67. The other input to NAND gate 67 is supplied by complemented clock pulses denoted by clock'. The NAND gate 67 supplies a series of clock pulses to an inverting NAND gate 69 which feeds clock pulses in the proper form to the flip-flops. Thus, when clock pulses are gated out of NAND gates 67 and 69, the pulses are fed to the set clock inputs of flip-flops 61 and 65 and both the set and reset clock inputs of the variable square wave flip-flop 45 for clocking them to the states controlled by inputs S and R of the flip-flops. The flip-flops 61 and 65 are reset when the BCD counter goes to 0 degree and thus readies the latching circuit for another cycle.

The operation of the present invention is essentially that the outputs from the counter stages one to eighteen are compared with the respective thumbwheel outputs of the phase setting circuit in NAND gate coincidence circuit 39 and when coincidence is achieved provides an output signal to the $\theta$ gate 40 for triggering the variable square wave flip-flop 45. The output of the $\theta$ gate 40 is also fed to flip-flop 61 for setting the same. Flip-flop 61 as well as flip-flop 65 were previously reset when the BCD counter 33 was cycled to 0°. Thus, flip-flops 61 and 65 each provide a logic 0 signal to NAND gate 63 which provides a logic 1 output signal to NAND gate 67. This NAND gate is also provided with complemented clock input pulses and provides an output of a series of clock pulses which are inverted by NAND gate 69. The clock pulses are fed to the set and reset clock inputs of the variable square wave flip-flop 45, denoted by $c_S$ and $c_R$, and the set clock inputs of flip-flops 61 and 65.

Thus, when the $\theta$ coincidence initially occurs, the variable square wave flip-flop is set as well as flip-flop 61. The NAND gate 63 continues to supply logic 1 signals to NAND gate 67 even though the input thereto from flip-flop 61 is at logic 1, since the input from flip-flop 65 is still at logic 0. Clock pulses continue to be thus provided by NAND gates 67 and 69 to flip-flops 45, 61 and 65. However, when coincidence is achieved for $\theta+180°$, the $\theta+180°$ gate 42 enables the reset input of the variable square wave flip-flop 45 which is thereby triggered to the reset state and also enables the set input of flip-flop 65. The triggering of flip-flop 65 results in two logic 1 signals being supplied to NAND gate 63 and therefore a logic 0 signal being fed to NAND gate 67. Thus, NAND gates 67 and 69 no longer function to provide clock pulses to the variable square wave flip-flop 45 which has been reset in this example and to flip-flops 61 and 65. Thus, flip-flop 45 cannot change state again due to additional coincidence from $\theta$ gate 40 or $\theta+180°$ gate 42. When the BCD counter 33 is cycled to 0°, both flip-flops 61 and 65 are reset and against provide logic 0 output signals to NAND gate 63. Accordingly, flip-flop 45 provides a square wave output which is phase shifted from the wave produced by flip-flop 35 and is at logic 1 from $\theta$ to $\theta+180°$ and is at logic 0 from $\theta+180°$ to $\theta+360°$. As with the output of flip-flop 35, the output of flip-flop 45 is filtered by the filter 49 to provide a phase shifted sine wave therefrom.

It can be seen from the foregoing that the present invention provides digital apparatus for the generation of a wave having a highly accurate predetermined phase setting with an accuracy, in the embodiment illustrated, of .01° in phase. As stated previously, the apparatus of this invention is primarily intended for use in check out equipment for VOR receivers although other uses will become readily apparent to those of ordinary skill in the art. In addition, many modifications and variations of the present invention are possible in the light of the above teachings. It should therefore be understood that within the scope of the appended claims, the invention may be practiced otherwise than as specifically described.

I claim:
1. Digital apparatus for producing a variable wave having an accurately predetermined phase shift from a reference wave, comprising in combination:
   (a) a binary coded decimal counter having a plurality of stages;
   (b) clock means connected to said counter for stepping said counter through a predetermined range at a predetermined rate, each step of said predetermined range corresponding to a predetermined phase angle;
   (c) a reference wave flip-flop connected to the output of said counter and adapted to be triggered on when said counter steps through the range corresponding to phase angles of 0° through 180° and being triggered off through the range of phase angles from 180° to 360° so as to produce a corresponding reference square wave;
   (d) an adjustable phase setting circuit having the same plurality of stages as said counter wherein each of said counter stages corresponds to one phase setting circuit stage and each of said counter and said phase setting circuit stages being adapted to be in either of two states, said counter stages changing their states as said counter repeatedly steps through its range and said phase setting circuit stages being set to a predetermined counter step corresponding to a predetermined phase angle $\theta$;
   (e) phase shifting means for converting the output states of said phase setting circuit stages corresponding to the phase angle $\theta$ to output state signals corresponding to a phase angle $\theta+180°$;
   (f) first coincidence circuit means for comparing outputs from said counter stages and said phase setting circuit stages and providing an output signal each time a counter step is such that the positions of all the counter stages correspond to the positions set on the corresponding phase setting stages of phase angle $\theta$;
   (g) second coincidence circuit means for comparing outputs from said counter stages and outputs from said phase setting circuit stages corresponding to the phase angle $\theta+180°$ and providing an output signal each time a counter step is such that the output signals of all of the counter stages correspond to the signals of the phase setting stages representing the phase angle $\theta+180°$;
   (h) variable square wave flip-flop means responsive to the first output of said first coincidence circuit means for providing an output signal of a predetermined level and responsive to the first output of said second coincidence circuit means for being triggered off such that said flip-flop produces a square wave output which is shifted from the reference wave by the phase angle $\theta$; and
   (i) latching circuit means responsive to the output signals of said coincidence circuits for maintaining the output signal of said variable square wave flip-flop at its predetermined level and for being disabled after both outputs of said coincidence circuits occur, such that said variable square wave flip-flop is maintained in its on state from the phase angle $\theta$ to the phase angle $\theta+180°$ and in its off state from the phase angle $\theta+180°$ to $\theta+360°$.

2. Digital apparatus as defined in claim 1 and further comprising:
   (a) first filter means coupled to the output of said reference square wave flip-flop for converting the reference square wave to a reference sine wave; and
   (b) second filter means coupled to the output of said variable square wave flip-flop for converting the phase shifted variable square wave to a phase shifted variable sine wave.

3. Digital apparatus as defined in claim 1 wherein said first coincidence means comprises a plurality of NAND gates corresponding to the number of stages of said counter and said phase setting circuit and adapted to receive the complementary output from said counter stage and the true output of said phase setting circuit for detecting coincidence therebetween.

4. Digital apparatus as defined in claim 1 wherein said first and second coincidence circuits include a common arrangement of coincident detecting NAND gates for the lower order stages of the counter and phase setting circuit which output states are similar for both the phase angle $\theta$ and the phase angle $\theta+180°$, and said phase shifting means shifting only the higher order stages of said phase setting circuit from the phase angle $\theta$ to the phase angle $\theta+180°$.

5. Digital apparatus as defined in claim 1 wherein said latching circuit means comprises:
   (a) a first flip-flop responsive to the first output signal of said first coincidence circuit for providing an output signal of a predetermined level;
   (b) a second flip-flop responsive to the first output signal of said second coincidence circuit for providing an output signal of the predetermined level;
   (c) a first NAND gate coupled to the outputs of said first and second flip-flops for providing an output signal of the predetermined level only when both of the outputs of said first and second flips are not at the predetermined level simultaneously;
   (d) a second NAND gate having one input coupled to the output of said first NAND gate and the other input adapted to receive a series of clock pulses for providing a clock pulse output; and (e) a third NAND gate coupled to the output of said second NAND gate for providing clock pulses to said variable square wave flip-flop and said first and second flip-flops such that said latching circuit means provides clock pulses for maintaining the output signal of said variable square wave flip-flop at the predetermined level from the phase angle $\theta$ to the phase angle $\theta+180°$ and does not provide clock pulses from the phase angle $\theta+180°$ to $360°$.

References Cited

UNITED STATES PATENTS

| 3,137,818 | 6/1964 | Clapper | 328—55 |
| 3,263,174 | 7/1966 | Bjorkman et al. | 328—155 X |
| 3,271,688 | 9/1966 | Gschwind et al. | 328—55 |

JOHN S. HEYMAN, Primary Examiner

U.S. Cl. X.R.

328—74, 93, 109, 141, 155